(12) United States Patent
Buerli et al.

(10) Patent No.: US 9,599,264 B2
(45) Date of Patent: Mar. 21, 2017

(54) CLAMPING JOINT FOR PIPES

(71) Applicant: Georg Fischer JRG AG, Sissach (CH)

(72) Inventors: Stephan Buerli, Frenkendorf (CH);
Thomas Knoernschild, Reinach (CH);
Enrico Camelin, Gelterkinden (CH)

(73) Assignee: Georg Fischer JRG AG (CH)

( * ) Notice: Subject to any disclaimer, the term of this patent is extended or adjusted under 35 U.S.C. 154(b) by 15 days.

(21) Appl. No.: 14/409,334

(22) PCT Filed: Jun. 5, 2013

(86) PCT No.: PCT/EP2013/061574
§ 371 (c)(1),
(2) Date: Dec. 18, 2014

(87) PCT Pub. No.: WO2013/189740
PCT Pub. Date: Dec. 27, 2013

(65) Prior Publication Data
US 2015/0167874 A1    Jun. 18, 2015

(30) Foreign Application Priority Data

Jun. 20, 2012 (EP) .................................. 12172685

(51) Int. Cl.
*F16L 33/22*    (2006.01)
*F16L 37/138*   (2006.01)

(52) U.S. Cl.
CPC .......... *F16L 33/225* (2013.01); *F16L 37/138* (2013.01)

(58) Field of Classification Search
CPC ........ F16L 17/02; F16L 21/007; F16L 21/02; F16L 21/022; F16L 21/06; F16L 37/091; F16L 33/225; F16L 37/138; H01R 9/0524
See application file for complete search history.

(56) References Cited

U.S. PATENT DOCUMENTS 3,907,399 A * 9/1975 Spinner ............... H01R 9/0521
174/89
6,530,807 B2 * 3/2003 Rodrigues ........... H01R 9/0521
439/578

(Continued)

FOREIGN PATENT DOCUMENTS

DE         4239705 C2    12/1993
DE        19514210 C2    11/1997

(Continued)

OTHER PUBLICATIONS

International Search Report (in English and German) and Written Opinion (in German) for PCT/EP2013/061574, mailed Apr. 23, 2014; ISA/EP.

*Primary Examiner* — Daniel P Stodola
*Assistant Examiner* — Zachary Dragicevich
(74) *Attorney, Agent, or Firm* — Harness, Dickey & Pierce, P.L.C.

(57) ABSTRACT

A clamping connection for pipes made of polymer material or made of composite materials, containing a connection piece, which has a supporting sleeve for the sliding on of a pipe to be connected and which is bounded at one end by a stop collar, wherein a sealing element is arranged on the supporting sleeve, wherein the clamping connection also comprises a clamping sleeve, which is captively connected to the stop collar of the connection piece before the pipe installation, wherein a pipe inserted onto the supporting sleeve is clamped by sliding the clamping sleeve over the pipe in a direction opposite to the insertion direction of the pipe.

20 Claims, 4 Drawing Sheets

(56) References Cited

U.S. PATENT DOCUMENTS

| | | | |
|---|---|---|---|
| 6,641,177 | B1 | 11/2003 | Pinciaro |
| 7,063,565 | B2 * | 6/2006 | Ward .................. H01R 13/506 |
| | | | 439/578 |
| 2002/0000721 | A1 | 1/2002 | Ohya |
| 2005/0012332 | A1 * | 1/2005 | Werth ........................ 285/322 |
| 2007/0216158 | A1 | 9/2007 | Kertesz et al. |
| 2009/0256354 | A1 * | 10/2009 | Ullrich et al. ................ 285/308 |
| 2012/0161436 | A1 * | 6/2012 | Salehi-Bakhtiari ........... 285/308 |

FOREIGN PATENT DOCUMENTS

| | | |
|---|---|---|
| DE | 20-2004-000031 U1 | 7/2004 |
| EP | 1598903 A2 | 11/2005 |
| EP | 1835220 A1 | 9/2007 |

* cited by examiner

CLAMPING JOINT FOR PIPES

CROSS-REFERENCE TO RELATED APPLICATIONS

This application is a National Stage of International Application No. PCT/EP2013/061574, filed on Jun. 5, 2013, and published in German as WO 2013/189740 A2 on Dec. 27, 2013. This application claims the benefit and priority of European Application No. 12172685.5, filed on Jun. 20, 2012. The entire disclosures of the above applications are incorporated herein by reference.

BACKGROUND

This section provides background information related to the present disclosure which is not necessarily prior art.

Technical Field

The disclosure relates to a clamping joint for pipes made of polymer material or of composite materials, said clamping joint including a connector, which has a support sleeve for fitting onto a pipe to be connected and which is defined at one end by way of a stop collar, wherein a sealing element is arranged on the support sleeve, wherein the clamping joint additionally has a clamping sleeve which is already captively connected to the stop collar of the connector prior to the mounting of the pipe.

Discussion

Pipes made of polymer material such as, for example, PE-X pipes and multilayer composite pipes which, for example, have an inside and outside layer made of a polymer material such as PE-X and an intermediate layer made of aluminium, are predominantly used in domestic engineering, in the supply of drinking water, for floor heating or heating unit service lines.

Clamping joints of this type are used in the majority of cases in heating and sanitation installations in order to connect pipes together or to fittings. A clamping joint provides for simple and rapid assembly. In addition, permanent sealing is ensured, which is extremely important in the case of such joints as considerable damage can occur in the event of water leakage.

DE 42 39 705 C2 makes known a clamping joint which consists of a clamping sleeve and a basic fitting body. The clamping sleeve has an inside contour which is realized, proceeding in each case from the two sleeve ends towards the middle of the clamping sleeve, as a conically narrowing or combined conically/convexly narrowing bore. The effect of said inside contour of the clamping sleeve is that the clamping sleeve can be used regardless of how it is placed in position on the pipe.

Disadvantages here are the production of the complicated inside contour of the clamping sleeve and the subsequent control of the contour.

DE 195 14 210 C2 also discloses a clamping joint for pipes and hoses of the same type. The support and clamping sleeves are realized in such a manner that they improve the sealing capacity and also the longitudinal adhesion capacity, which is to be achieved by means of the ribs on the support sleeve and the inside contour of the clamping sleeve.

The disadvantage of the two clamping joints mentioned previously is that the pipe to be connected has first of all to be widened prior to the connection in order to be able to push it subsequently over the support sleeve. This requires an additional operating step which makes the assembly more expensive. In addition, in the case of the connections mentioned previously the fitting on of the clamping sleeve prior to the attaching of the pipe on the support sleeve can easily be forgotten, which is why the pipe then has to be removed again from the support sleeve and the clamping sleeve has subsequently to be fitted onto the pipe. The pipe can then be pushed onto the support sleeve from the beginning.

DE 20 2004 000 031 U1 discloses a pipe press coupling which has a support sleeve, a press sleeve and a crimping sleeve. The individual parts are already pre-assembled prior to the mounting of the pipe so that the assembly expenditure can be reduced to a minimum. In addition, the assembly itself is considerably simplified as a result of the pipe coupling not having to be assembled first of all.

A disadvantage of said coupling, however, is the severe cross-sectional narrowing with regard to the pipe cross section. In addition, the disadvantage of this type of pipe connection, as with the previously mentioned connections, is that where there is strong tensile force on the pipe the clamping/pressing or clamping sleeve/press sleeve becomes detached.

SUMMARY OF THE DISCLOSURE

It is an object of the disclosure to propose a clamping joint which is simple to mount and is able to be produced in a favourable manner. In addition, if there is tensile force on the mounted pipe the joint must not become detached or the clamping joint should become stronger.

Said object is achieved according to the disclosure in that the clamping of a pipe inserted on the support sleeve is effected by moving the clamping sleeve over the pipe in the direction opposite to the direction in which the pipe is inserted.

An advantageous development of said clamping joint is that the inside diameter of the connector corresponds approximately to that of the pipe to be inserted or is slightly smaller than the inside diameter of the pipe to be inserted. As a result, cross-sectional narrowings in the line or in the connection to fittings are able to be kept small by means of the clamping joint according to the disclosure, which is positive in terms of flow techniques.

The attaching of the clamping joint according to the disclosure on the pipeline or the inserting of the pipe into the clamping joint does not require any prior widening of the pipe by means of an additional operating process in order to fit it onto the connector afterwards, as is known from clamping joints from the prior art. The lead-in cone on the connector or on the support sleeve enables the pipe to be inserted without having to widen it first of all. The lead-in cone serves, among other things, for widening the pipe.

The stop collar of the connector additionally serves for the purpose of preventing the clamping sleeve from moving on one side in the mounted state of the clamping joint, or serves as a one-sided stop for the clamping sleeve. As a result of this such a joint is also not removable again.

An additional achievement provided by the clamping joint according to the disclosure is that the connection or clamping is strengthened in the event of tensile force being exerted onto the pipe. As the displacement of the clamping sleeve in the direction of the sealing element, through the tensile force on the pipe, strengthens the clamping between the sealing element or the support sleeve and the tapered inside diameter of the clamping sleeve even more.

The clamping sleeve preferably has two regions. One of these is elastic and serves for the pre-assembly as well as the assembly of the clamping joint. The second region is rigid and serves for the clamping as well as the guiding of the pipe. The clamping sleeve can obviously have even more regions.

The clamping of the pipe interacting with the sealing element or with the cross-sectional widening of the support sleeve is achieved by the tapering of the inside diameter. The tapering is effected in the rigid region of the clamping sleeve in the direction of the elastic region, the dimension of the inside diameter of the elastic region being independent of the development of the inside diameter or of the inside contour of the rigid region. The inside diameter in the elastic region is preferably greater than the outside diameter of the inserted pipe and is not tangent to the pipe even in the mounted state of the clamping joint.

The elastic region is formed by the at least two segments which are preferably distributed in a regular manner over the circumference. The elastic region preferably has eight to 16 segments which ensure the radial elasticity.

A channel along the inside diameter of the segments serves for the axial positioning as well as fixing of the clamping sleeve. As a result, the clamping sleeve is fixed and positioned or pre-positioned on the stop collar. The channel corresponds to the width of the stop collar. An advantageous design consists in that the clamping sleeve in the channel as well as the stop collar have a corresponding phase or inclination which simplifies the assembly or the pushing down of the clamping sleeve from the stop collar.

BRIEF DESCRIPTION OF THE DRAWINGS

The drawings described herein are for illustrative purposes only of selected embodiments and not all possible implementations, and are not intended to limit the scope of the present disclosure.

An exemplary embodiment of the disclosure is described by way of the Figures, the disclosure not being restricted to only the exemplary embodiment, in which.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
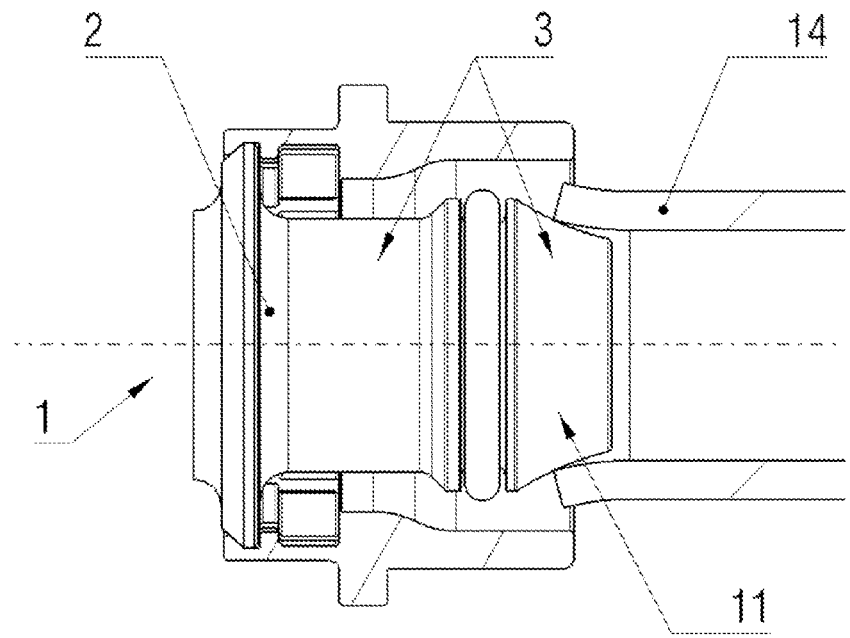
FIG. 1 shows a longitudinal section through a pre-assembled clamping joint according to the disclosure at the beginning of the mounting of the pipe.
Figure 2:
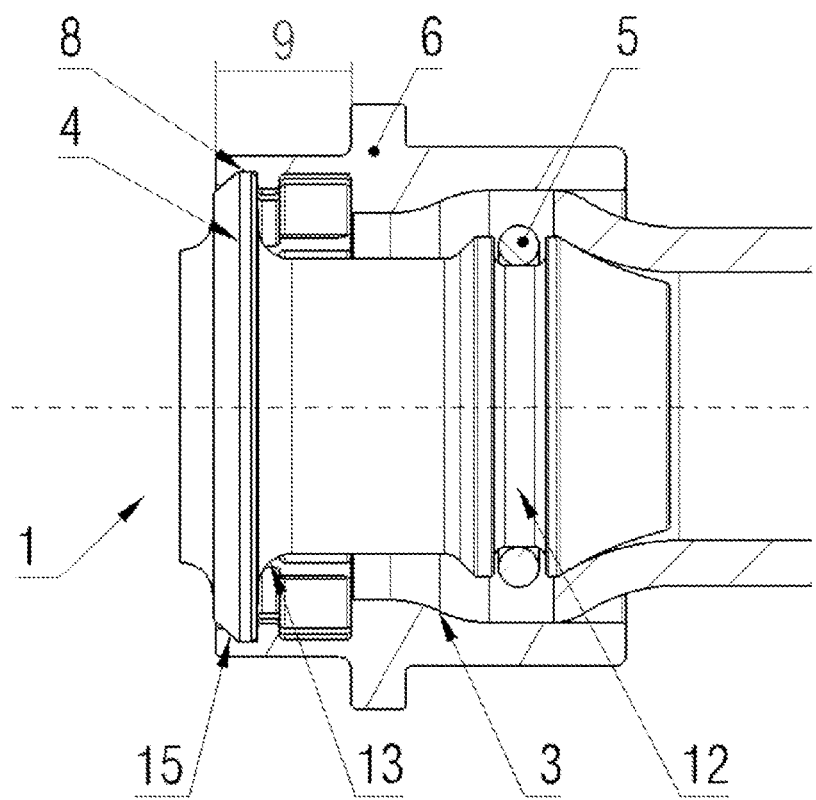
FIG. 2 shows a longitudinal section through a pre-assembled clamping joint according to the disclosure with the mounting of the pipe having progressed only a little.
Figure 3:
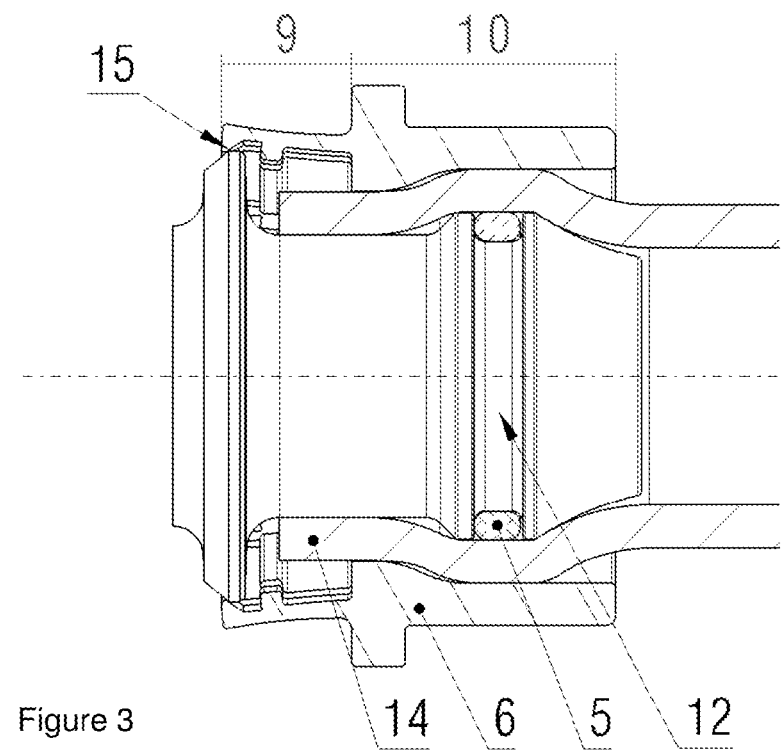
FIG. 3 shows a longitudinal section through a pre-assembled clamping joint according to the disclosure with the pipe inserted completely.

FIG. 1 shows a clamping joint 1 according to the disclosure where the pipe 14 to be connected has already been pushed lightly onto the conical region of the support sleeve 3 or the lead-in cone 11. The connector 2 has a lead-in cone 11 which makes it possible for the pipe 14 to be connected to be inserted. The lead-in cone 11 makes it possible to dispense with a previous widening of the pipe 14, which saves on one operating step during assembly and, as a result, makes the assembly simpler and quicker. The pipe 14, which is produced from a polymer material or from a composite material, is widened as it is being inserted over the lead-in cone 11, as a result of which the insertion of the connector 2 or of the support sleeve 3 is made possible. The clamping sleeve 6, which is already pre-assembled on the connector 2, serves, among other things, for guiding the pipe 14 during the insertion, which can be seen from FIG. 2. When reaching the clamping sleeve 6, the pipe 14 is directed along the inside contour or the inside diameter of the clamping sleeve 6 and along the support sleeve 3. The sealing element 5, which is preferably formed by an O-ring seal, serves for the optimum tightness of the clamping joint 1. The sealing element 5 is arranged on the support sleeve 3 and is situated in a groove 12 which is provided for this purpose and which prevents the displacement of the sealing element 5. The pipe 14 is pushed into the clamping joint 1 as far as up to the radius 13 and is then fastened to the clamping sleeve 6, which is already pre-assembled on the connector 2. The clamping sleeve 6, as already mentioned, is pre-assembled on the connector 2. The connector 2 has a stop 4 on the opposite end of the lead-in cone 11 of the support sleeve 3. Said stop serves, among other things, for the pre-assembly of the clamping sleeve 6. The clamping sleeve 6 is fastened on the stop collar 4. The pre-assembly and the removal of the clamping sleeve 6 from the stop collar 4 are ensured by means of the radially elastic region 9 of the clamping sleeve 6. A radially elastic region 9 on the clamping sleeve 6 is formed by the arrangement of segments 7 on the clamping sleeve 6, which can be seen in FIG. 7. For the pre-assembly, the segments 7 can be widened slightly in the radial direction in order to insert the stop collar 4 of the connector 2. Through their elasticity they are then clamped on the stop collar 4 in a fixed manner, the inside contour of the segments 7 having a channel 8, which corresponds to the width of the stop collar 4, as a result of which the clamping sleeve 6 is fixed or positioned in an axial manner on the stop collar 4. The elastic region 9 consists of at least two segments 7. It is advantageous when both the clamping sleeve 6 and also the stop collar 4 have a phase 15 which simplifies the pushing down of the clamping sleeve 6 from the stop collar 4 onto the inserted pipe 14. FIG. 3 illustrates this operation. The elastic region 9, which is formed by the segments 7, is deformed in a manner such that the clamping sleeve 6 is pushed in the direction opposite to the insertion of the pipe 14, as a result of which the phase 15 of the clamping sleeve 6 can be pushed over the phase 15 of the stop collar 4 and, as a result, the clamping sleeve 6 can be pushed onto the inserted pipe 14. By the inside contour or the inside diameter of the clamping sleeve 6 having a tapering in the rigid region 10 of the clamping sleeve 6, the inside diameter in the rigid region 10 reducing in the direction of the elastic region 9, during the assembly or the clamping operation, the tapered part of the clamping sleeve 6 or the clamping sleeve 6 is moved in the direction of the sealing element 5. By means of the sealing element 5 and the groove 12 provided for said sealing element, the support sleeve 3 has an enlarged cross section at this position, which brings about a clamping action when the clamping sleeve 6 is displaced in the direction of the sealing element 5.

Figure 4:
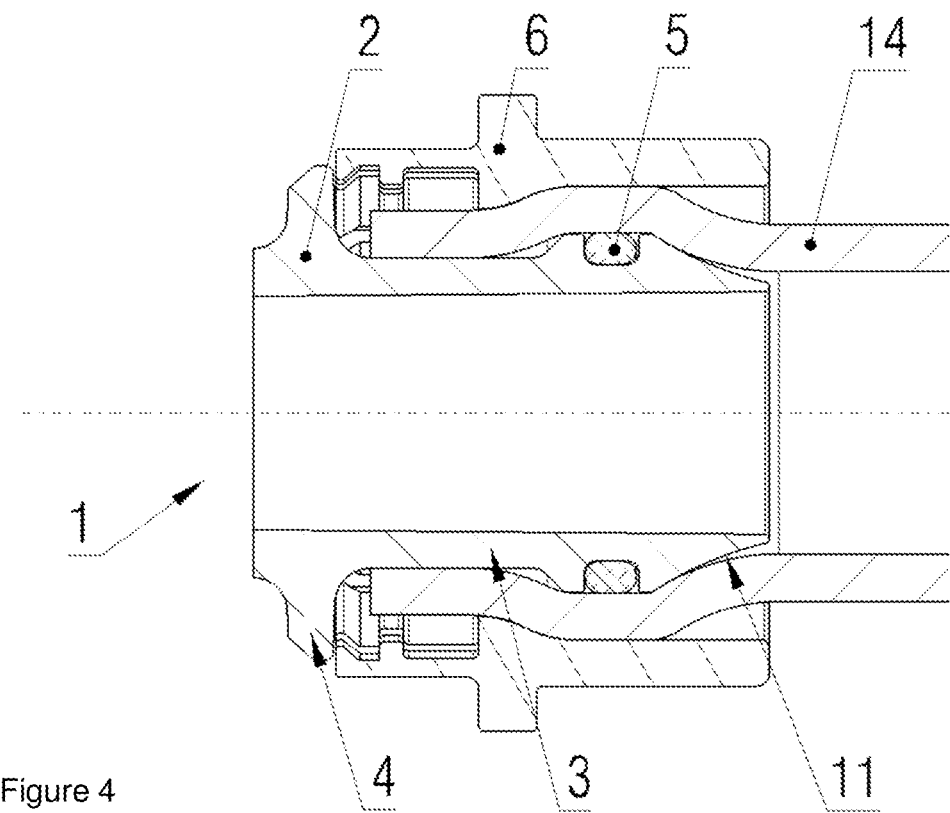
FIG. 4 shows a longitudinal section through a pre-assembled clamping joint according to the disclosure in the finished assembled state.

FIG. 4 shows the finished assembled clamping joint 1. It can also be seen from FIG. 4 that the clamping would be strengthened by tensile force on the pipe 14 as the clamping sleeve 6 would also move in said same direction and thus would appear at the sealing element 5 on account of the tapered diameter of the clamping sleeve 6 or the pipe 14 situated in between would be crimped accordingly. The stop collar 4 serves after the assembly for the purpose of also defining the clamping sleeve 6 in the other direction and ensuring that it cannot be removed.

No such clamping joint, where the fitting on of the clamping sleeve is effected against the direction in which the pipe is inserted, is known from the prior art, as such an operation up to now has been perceived as not logical since, as a result, the pipe in the case of the known clamping joints would be pushed down again by the support sleeve. In addition, in the case of conventional clamping joints which are pre-assembled, the clamping sleeve is also attached on the support sleeve, however not on the side of the stop collar but on the side of the pipe to be inserted.

An assembly in said direction of the pipe 14 is possible by means of the development of the inside contour or of the tapering of the inside diameter of the clamping sleeve 6 of the present disclosure and the cross-sectional widening of the support sleeve 3 by the sealing element 5, a mere cross-sectional widening on the support sleeve 3 without a sealing element 5 being equally conceivable in order to achieve said clamping effect where the clamping is strengthened instead of removed when there is tensile force on the pipe. It can also be seen from FIG. 4 that the inside diameter of the connector 2 has approximately the same cross section or diameter as the pipe to be inserted. As a result, a narrowing of the line in the case of pipe couplings or fitting connections is able to be reduced with the clamping joint according to the disclosure. In addition, an optimum transition is formed by the lead-in cone 11 such that no flow-impairing obstructions are created by the inserted connector 2.

Figure 5:
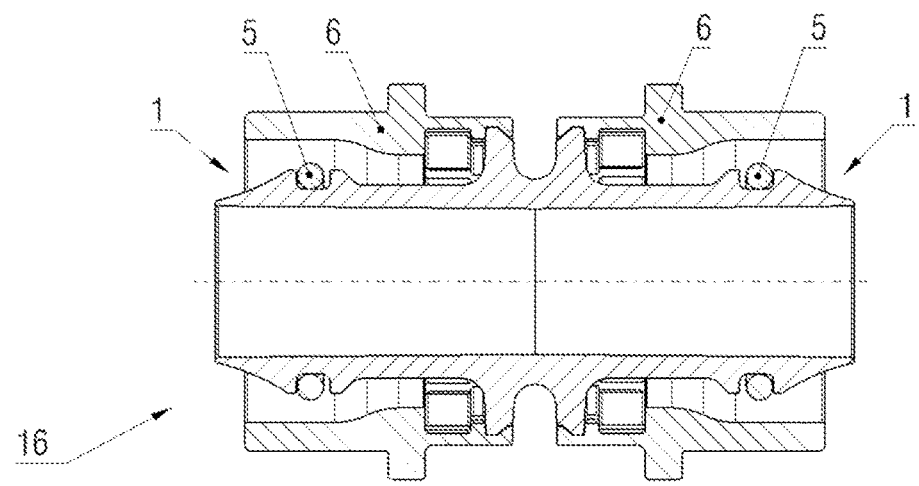
FIG. 5 shows a longitudinal section through a pre-assembled pipe coupling which has a clamping joint according to the disclosure on both sides.

FIG. 5 shows a pipe coupling 16 which is suitable for connecting pipes 14. The coupling 16 has a clamping joint 1 according to the disclosure on both sides. The pipe coupling 16 is shown in the pre-assembled state. Such clamping joints 1 are also suitable, for example, for connections on fittings.

Figure 6:
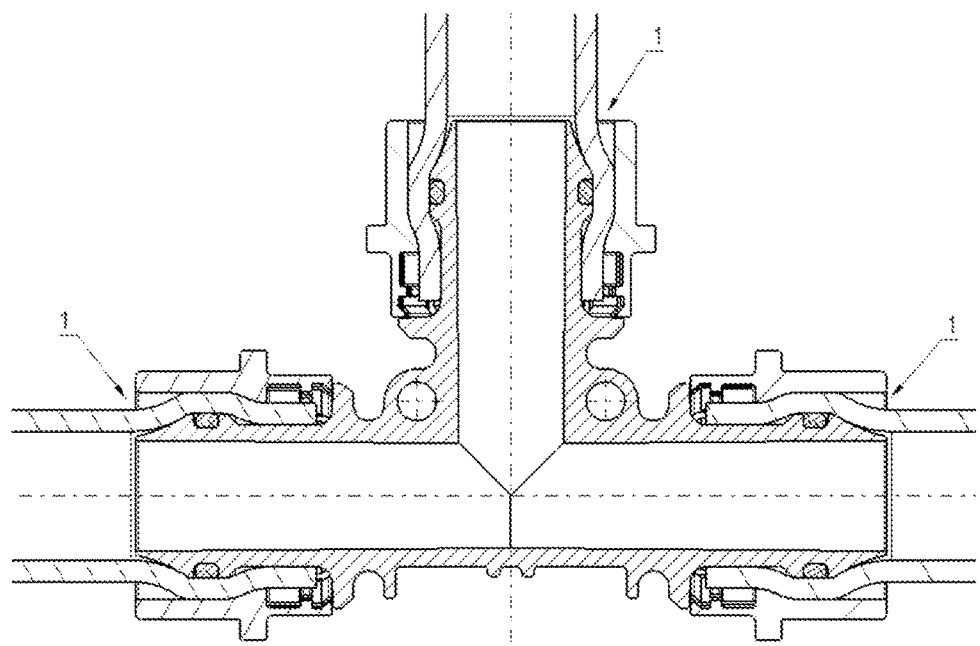
FIG. 6 shows a view of a distributor which has clamping joints according to the disclosure for connecting the pipes and FIG. 7 shows a longitudinal section and a view of the clamping sleeve of the clamping joint according to the disclosure.

FIG. 6 shows a clamping joint 1 according to the disclosure which is arranged on a distributor.

Figure 7:
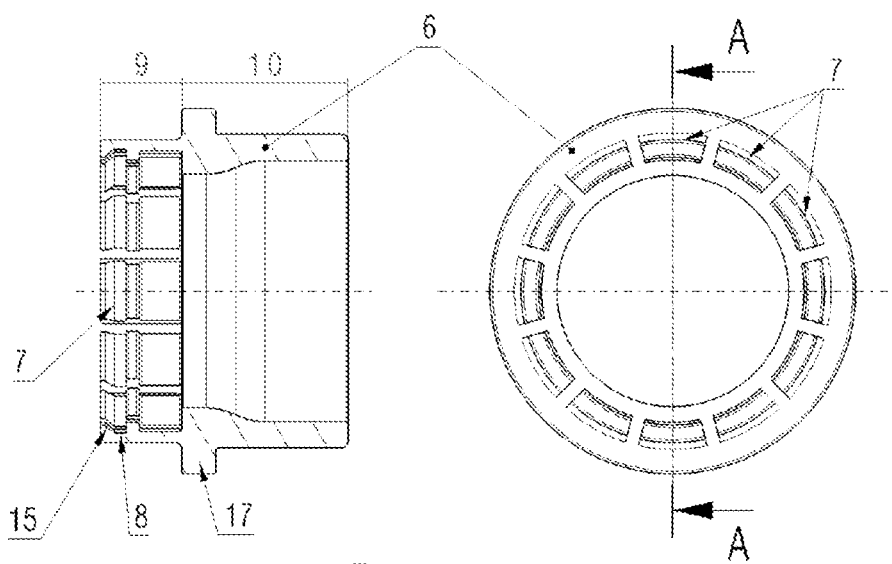

The clamping sleeve 6 of the clamping joint 1 according to the disclosure, which is shown separately in FIG. 7, has an elastic region 9. The radially elastic region 9 is composed of segments 7 which are arranged along the circumference. The number and size of the segments 7 are to be adapted to the requirements of the clamping joint 1 and to its dimension. In addition, the clamping sleeve 6 has a rigid region 10 which makes it possible for the inserted pipe 14 to be clamped. The inside contour or the inside diameter in the rigid region 10 is tapered in the direction of the elastic region 9, as a result of which, as described previously, the clamping action is achieved in dependence on the support sleeve 3. The clamping sleeve 6 preferably has a web 17 on the outer circumference, which web serves for the assembly. The clamping joint 1 can be mounted with the aid of a corresponding assembly tool by means of the web 17 on the clamping sleeve 6.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A clamping joint for pipes made of polymer material or of composite materials, said clamping joint including a connector which has a support sleeve for fitting onto a pipe to be connected and which is defined at one end by way of a stop collar, wherein a sealing element is arranged on the support sleeve, wherein the clamping joint additionally has a clamping sleeve which is captively connected to the stop collar of the connector prior to the mounting of the pipe, wherein the clamping of a pipe inserted on the support sleeve is effected by moving the clamping sleeve directly over the pipe in the direction opposite to the direction in which the pipe is inserted; and wherein:
   the clamping sleeve moves from a first position to a second position to clamp the pipe directly between the clamping sleeve and the support sleeve;
   in the first position an end region of the clamping sleeve is captively connected to the stop collar; and
   in the second position the end region is removed from the captive connection to the stop collar.

2. The clamping joint according to claim 1, wherein the inside diameter of the connector corresponds approximately to the inside diameter of the pipe to be inserted or is slightly smaller than the inside diameter of the pipe to be inserted.

3. The clamping joint according to claim 1, wherein the connector has a lead-in cone.

4. The clamping joint according to claim 1, wherein the stop collar of the connector prevents the clamping sleeve moving on one side once the pipe has been mounted.

5. The clamping joint according to claim 1, wherein pulling out the inserted pipe displaces the clamping sleeve in the direction of the sealing element and strengthens the clamping.

6. The clamping joint according to claim 1, wherein the end region of the clamping sleeve is a radially elastic region and the clamping sleeve further having a rigid region.

7. The clamping joint according to claim 6, wherein the inside diameter of the clamping sleeve tapers in the rigid region.

8. The clamping joint according to claim 7, wherein the inside diameter of the clamping sleeve tapers in the rigid region in the direction of the elastic region.

9. The clamping joint according to claim 6, wherein the elastic region of the clamping sleeve is formed by at least two radially arranged segments.

10. The clamping joint according to claim 9, wherein the segments have a radially extending channel.

11. The clamping joint of claim 1 wherein:
   an inner wall of the clamping sleeve and an outer wall of the support sleeve defining an annular channel for directly receiving the pipe, the support sleeve having an enlarged cross-section, and the clamping sleeve having a taper that cooperates with the enlarged cross-section of the support sleeve to clamp the pipe therebetween when the clamping sleeve is moved to the second position.

12. The clamping joint of claim 11 wherein the sealing element is located on the enlarged cross-section of the support sleeve.

13. The clamping joint of claim 12 wherein the clamping sleeve taper slopes radially inwardly towards the stop collar and the enlarged cross section of the support sleeve also presents a taper that slopes radially inwardly towards the stop collar.

14. The clamping joint of claim 13 wherein the sealing element is located on the enlarged cross-section of the support sleeve away from the taper in a direction away from the stop collar.

15. A clamping joint for pipes comprising:
a support sleeve having a lead in cone at one end for engaging an inner diameter of the pipe;
a radially outwardly extending stop collar at an opposite end of the support sleeve;
the support sleeve further including a radially outwardly extending sealing element thereon located between the cone and the stop collar;
a clamping sleeve surrounding the support sleeve, one region of the clamping sleeve being captively connected to the stop collar prior to mounting of the pipe, an opposite region of the clamping sleeve extending over the cone;
an inner wall of the clamping sleeve and an outer wall of the support sleeve defining an annular channel for receiving the pipe, in which, during insertion of an end of the pipe into the channel towards the stop collar, the inner wall of the clamping sleeve directly contacts an outer wall of the pipe and the sealing element contacts an inner wall of the pipe; and wherein
the clamping of a pipe inserted on the support sleeve is effected by moving the clamping sleeve over the pipe in the direction opposite to the direction in which the pipe is inserted; and wherein:
the clamping sleeve moves from a first position to a second position to clamp the pipe;
in the first position an end region of the clamping sleeve is captively connected to the stop collar; and
in the second position the end region is removed from the captive connection to the stop collar.

16. The clamping joint of claim 15 wherein:
the cone has a taper that flares the end of the pipe radially outwardly towards the sealing element.

17. The clamping joint of claim 16 wherein:
a taper on the inner wall of the clamping sleeve located between the sealing element and the stop collar bends the pipe radially inwardly until the end of the pipe is adjacent the stop collar.

18. The clamping joint for pipes of claim 15 wherein said end region of the clamping sleeve is elastically deformable, with a portion of the end region temporarily grasping the stop collar until the end region is removed from the stop collar during clamping of the pipe.

19. A clamping joint for pipes comprising:
a support sleeve having a lead in cone at one end for engaging an inner diameter of the pipe;
a radially outwardly extending stop collar at an opposite end of the support sleeve;
the support sleeve further including a radially outwardly extending sealing element thereon located between the cone and the stop collar;
a clamping sleeve surrounding the support sleeve, one region of the clamping sleeve being captively connected to the stop collar prior to mounting of the pipe, an opposite region of the clamping member extending over the cone;
an inner wall of the clamping sleeve and an outer wall of the support sleeve defining an annular channel for receiving the pipe, in which, during insertion of an end of the pipe:
a.) the cone flares the end of the pipe radially outwardly towards the sealing element;
b.) then, the pipe extends over the sealing element; and
c.) then, a taper on the inner wall of the clamping sleeve bends the pipe radially inwardly until the end of the pipe is adjacent the stop collar; and wherein
the clamping of a pipe inserted on the support sleeve is effected by moving the clamping sleeve over the pipe in the direction opposite to the direction in which the pipe is inserted; and wherein:
the clamping sleeve moves from a first position to a second position to clamp the pipe;
in the first position an end region of the clamping sleeve is captively connected to the stop collar; and
in the second position the end region is removed from the captive connection to the stop collar.

20. The clamping joint for pipes of claim 19 wherein said end region of the clamping sleeve is elastically deformable, with a portion of the end region temporarily grasping the stop collar until the end region is removed from the stop collar during clamping of the pipe.

* * * * *